United States Patent [19]

Bock et al.

[11] Patent Number: 4,694,046

[45] Date of Patent: Sep. 15, 1987

[54] HYDROPHOBICALLY ASSOCIATING TERPOLYMERS OF ACRYLAMIDE, SALTS OF ACRYLIC ACID AND ALKYL ACRYLAMIDE

[75] Inventors: Jan Bock, Bridgewater; Donald B. Siano, Fanwood, both of N.J.; S. Richard Turner, Pittsford, N.Y.

[73] Assignee: Exxon Research and Engineering Company, Florham Park, N.J.

[21] Appl. No.: 801,226

[22] Filed: Nov. 25, 1985

[51] Int. Cl.$^4$ ............................................. C08F 8/42
[52] U.S. Cl. ................................ 525/329.4; 525/367; 525/368; 525/369; 525/378; 526/303.1; 526/307.2
[58] Field of Search ................... 525/329.4; 526/303.1, 526/307.2

[56] References Cited

U.S. PATENT DOCUMENTS

| | | | |
|---|---|---|---|
| 4,254,249 | 3/1981 | Cottrell et al. | 525/329.4 |
| 4,395,524 | 7/1983 | Emmons et al. | 526/307.2 |
| 4,520,182 | 5/1985 | Turner et al. | 526/307.2 |
| 4,521,580 | 6/1985 | Turner et al. | 526/307.2 |
| 4,528,348 | 7/1985 | Turner et al. | 526/303.1 |

*Primary Examiner*—Joseph L. Schofer
*Assistant Examiner*—B. Lipman
*Attorney, Agent, or Firm*—Richard E. Nanfeldt

[57] ABSTRACT

Novel water soluble terpolymers of acrylamide, an alkali metal or ammonium salt of acrylic acid and an oil soluble or hydrophobic alkyl acrylamide monomer have been found to provide efficient viscosification of water or brine solutions. The polymers are prepared by a free radical micellar polymerization of acrylamide and alkyl acrylamide followed by base catalyzed partial hydrolysis. These terpolymers, called HRAM, impart unique and useful rheological properties to aqueous solutions. In a water or brine solution the hydrophobic groups associate to increase hydrodynamic size and enhance thickening efficiency. Solutions containing the HRAM terpolymers show increased viscosification at higher polymer concentration and reduced salt sensitivity relative to polyacrylamide based HPAM solutions.

4 Claims, No Drawings

HYDROPHOBICALLY ASSOCIATING TERPOLYMERS OF ACRYLAMIDE, SALTS OF ACRYLIC ACID AND ALKYL ACRYLAMIDE

BACKGROUND OF THE INVENTION

This invention relates to a novel aqueous fluid rheology or flow modifier composition and a method for producing same. These high molecular weight, water soluble polymers contain both water soluble and water insoluble monomers. The water soluble monomers are acrylamide (AM) and a salt of acrylic acid (H), and the water insoluble monomer is a higher alkylacrylamide (R). These polymers will be hereinafter referred to as HRAM. The process for their preparation relies on solubilizing the water insoluble monomer into an aqueous micellar solution containing one or more surfactants and the water soluble monomer(s). Charged groups are incorporated in these polymers by copolymerization with acrylic acid or an alkali metal acrylate, or by post-hydrolysis of some of the acrylamide units using an alkali hydroxide, such as sodium hydroxide. Aqueous solutions of these hydrophobically associating polymers exhibit enhanced viscosification, reduced salt sensitivity and other desirable rheological properties found useful in a variety of applications.

DESCRIPTION OF PRIOR ART

Polyacrylamide (PAM) and partially hydrolyzed polyacrylamide (HPAM) are well known water soluble polymers used for flocculation and for waste water treatment and dewatering sludge, and for rheology control for secondary or tertiary oil recovery. Further examples of the properties and uses of these polymers can be found in *Handbook of Water Soluble Gums and Resins*, R. L. Davidson, Ed., McGraw Hill, 1980, chapter 16 by H. Volkand and R. E. Friedrich, or in *Water Soluble Polymers*, N. M. Bikales, Ed., Plenum Press, 1973 by D. C. Williams, J. H. Rogers and T. J. West. Polyacrylamides rely on a combination of high molecular weight and chain expansion due to repulsion of pendant ionic groups along the polymer chain to viscosify or thicken aqueous fluids. However, high molecular weight polymers mechanically degrade when subjected to large elongational or shear stresses, such as found in pumps or during injection into reservoir rocks. This degradation results in permanent reduction in polymer molecular weight and, in turn, loss of viscosification efficiency. The presence of cations in aqueous solution, in particular divalent cations, shields the ionic charged groups on the polymer. This causes the polymer chains to collapse in a random coil type configuration, losing significant viscosification efficiency. Thus, polymeric viscosifiers based on an alternative mechanism of viscosification providing improved mechanical stability and salt tolerance relative to PAM and HPAM polymers would be highly desirable.

Processes for preparing polyacrylamides are well known in the art; Tanaka, et al., U.S. Pat. No. 4,154,910, teaches an aqueous solution method using the heat of polymerization to concentrate the product. Zimmerman, et al., U.S. Pat. No. 3,211,708 teaches an oil-in-water bead polymerization for polymerizing water soluble monomers. These techniques result in moderate molecular weight polymers exhibiting poor viscosification efficiency, particularly in saline solutions. Kolodny, U.S. Pat. No. 3,002,960, teaches a low temperature, redox initiated solution polymerization resulting in high molecular weight polyacrylamide. Another approach to high molecular weight water soluble polymers is described by J. W. Vanderhoff, et al., U.S. Pat. No. 3,284,393, where water soluble monomers are polymerized at high concentration in a water-in-oil emulsion. While some of these processes allow high molecular weight polymers to be prepared, the resulting PAM and HPAM systems provide only fair viscosification efficiency, poor mechanical stability and low salt tolerance.

One approach to overcoming the deficiencies in these polyacrylamide based systems is described by Turner, et al., U.S. Pat. No. 4,520,182. Water soluble acrylamide copolymers containing a small amount of oil soluble or hydrophobic alkylacrylamide groups were found to impart efficient viscosification to aqueous fluids. Furthermore, since these alkylacrylamide-acrylamide copolymers (RAM) were nonionic, they were relatively insensitive to the level of salt in the water. However, these polymers required concentrations above about 2,000 ppm to provide significant viscosification. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low, requiring 2 to 3 weight percent of polymer to provide an enhancement. The use of surfactants to enable solubility and, in turn, viscosification by a water soluble polymer containing hydrophobic groups is described by Evani, European Patent No. 0057875. The hydrophobic group claimed is attached to the polymer via an acrylate linkage which is known to have poor hydrolytic stability. In addition, the need for a surfactant to achieve solubility and thickening efficiency should make such a system very salt sensitive, as well as very sensitive to small changes in surfactant and polymer concentration. Emmons, et al., U.S. Pat. No. 4,395,524, teaches acrylamide copolymers as thickeners for aqueous systems. While these polymers possess hydrophobic groups, they are prepared using alcohol containing solvents which are known chain transfer agents. The resulting polymers have rather low molecular weights and, thus, relatively high polymer concentrations are required to achieve reasonable viscosification of water based fluids.

One of the objects of this invention is to overcome the deficiencies in the use of the water soluble polymers of the prior art for thickening aqueous fluids. A new class of water soluble polymers will be described which impart enhanced viscosification to aqueous fluids, improved mechanical stability and better salt tolerance. These new polymers contain a nonionic water soluble monomer, such as acrylamide, an anionically charged water soluble monomer, such as an alkali metal acrylate, and a water insoluble or hydrophobic monomer, such as alkylacrylamide with a chain length of six carbons or greater. When these polymers are placed in an aqueous solvent, the hydrophobic groups aggregate or associate in a manner similar to a surfactant. This hydrophobic association between polymer chains in solution results in an increase in the hydrodynamic size of the molecule, which, in turn, causes an increase in viscosity. We have found that the presence of ionic groups, such as sodium acrylate, cause an expansion of the polymer in solution, an improvement in polymer solubility and a favorable interaction with the hydrophobic groups. Thus, polymers containing both ionic acrylate groups and hydrophobic groups provide a significant improvement in viscosification efficiency of water based systems.

Synthesis of the hydrophobically associating polymers of the instant invention presents difficulties. The incompatibility of the oil soluble and water soluble monomers prevents an effective concentration of one or the other of these monomeric species from being achieved at the locus of polymerization of the other comonomer. Techniques for polymerizing water soluble polymer, such as those taught in U.S. Pat. Nos. 4,154,910, 3,211,708, 3,002,960 and 3,284,393, cannot be used to prepare the compositions of this invention. This art does not teach the formation of a sufficiently fine dispersion of the water and oil soluble monomers in the absence of chain transfer agents to enable uniform reaction and efficient aqueous viscosifiers to be prepared. The use of mutual solvents or solvent mixtures to dissolve the water and oil soluble monomers as taught by Lenke, et al., U.S. Pat. No. 4,151,333, and Barua, et al., U.S. Pat. No. 4,098,987, has some serious limitations. Although this approach undoubtedly allows the incompatible monomers to come into close proximity to one another, since the dispersion is on a molecular scale, often the resulting copolymer is insoluble in the same solvent, as shown in U.S. Pat. No. 4,151,333. This leads to precipitation of the copolymer before it has achieved sufficient molecular weight to provide efficient aqueous viscosification. The use of water miscible solvents, such as alcohols, ether and acetone, either alone or with water, as taught in U.S. Pat. No. 4,098,987, results in extremely low molecular weight (e.g., 10,000) polymers due to the high chain transfer characteristics of these solvents. Thus, polymers produced by these teachings are rather ineffective viscosifiers for aqueous fluids.

Two techniques have been found useful for preparing the compositions of the hydrophobically associating polymers of this invention. The first method was based on the use of a water continuous microemulsion to disperse the oil soluble monomer in a solution of the water soluble monomers. Details of the procedures and techniques are taught by Turner, et al., U.S. Pat. No. 4,521,580, which is incorporated herein by reference. The second and preferred method for preparing the compositions of this invention was based on dispersing the oil soluble monomers using an aqueous micellar solution of the water soluble monomers. Suitable surfactants and the details of the polymerization are taught by Bock, et al., U.S. Pat. No. 4,528,348, which is incorporated herein by reference. Using either the microemulsion or micellar polymerization technique there are two different routes for preparing the terpolymers of this invention. The first involved preparation of the alkylacrylamide-acrylamide copolymer by either the micellar or microemulsion polymerization, followed by controlled hydrolysis of some of the acrylamide groups to anionically charged metal acrylate groups. An alternative technique involved the terpolymerization of acrylamide, alkali metal acrylate and an N-alkylacrylamide, preferably using the micellar polymerization technique.

SUMMARY OF THE INVENTION

Novel water soluble terpolymers of acrylamide, a salt of acrylic acid and an oil soluble or hydrophobic N-alkylacrylamide monomer have been found to provide efficient viscosification of water or brine solutions. The polymers are prepared by a free radical micellar polymerization of acrylamide, alkali metal acrylate and an oil soluble N-alkylacrylamide or by micellar copolymerization of acrylamide and an oil soluble N-alkylacrylamide, followed by controlled partial hydrolysis to convert some of the acrylamide to an alkali metal acrylate. These novel terpolymers contain at least 60 mole percent acrylamide, 5 to 40 mole percent of an alkali metal or ammonium salt of acrylic acid, and 0.1 to 10 mole percent of an oil soluble N-alkylacrylamide having a chain length of 6 to 22 carbons. The anionic acrylate groups improve polymer stability in water and brine and impart some chain stiffness due to charge repulsion, particularly in water containing a low electrolyte concentration. The hydrophobic N-alkylacrylamide groups associate in aqueous solution to create a structure with an apparent increase in molecular weight, resulting in enhanced thickening efficiency. Thus, the anionic acrylate groups and hydrophobic groups are balanced to provide water and brine solubility, along with excellent thickening efficiency. In addition, aqueous fluids thickened with the polymer compositions of this invention have improved mechanical stability, when subjected to high shear, and better salt tolerance relative to polymers relying on molecular weight in place of the hydrophobic associations for viscosification.

DETAILED DESCRIPTION OF THE INVENTION

The water soluble polymers of the instant invention are characterized by the formula:

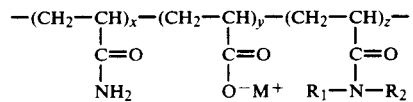

wherein $R_1$ is preferably a $C_6$ to $C_{22}$ straight chain or branched alkyl or cycloalkyl group, more preferably a $C_6$ to $C_{20}$, and most preferably a $C_6$ to $C_{18}$; and $R_2$ is the same or different alkyl group as $R_1$, or hydrogen or $C_1$ to $C_3$ straight chain or branched alkyl group; and M is an alkali metal or ammonium cation. Typical, but non-limiting, examples of preferred alkyl groups are hexyl, octyl, decyl, dodecyl and hexadecyl groups. Typical, but non-limiting, examples of preferred cations are sodium, potassium and ammonium. The mole percentage of acrylamide, x, is preferably about 60 to about 98, more preferably about 65 to about 95, and most preferably about 70 to about 90. The mole percentage of the salt of acrylic acid, y, is preferably about 2 to about 40, more preferably about 5 to about 35, and most preferably about 10 to about 30. The mole percentage of the hydrophobic group, z, is preferably about 0.1 to about 10.0, more preferably about 0.2 to about 5.0, and most preferably about 0.2 to about 2.0.

The molecular weight of the water soluble terpolymers of this invention is sufficiently high that they are efficient viscosifiers of water or brine, but not so high that the polymer molecules are readily susceptible to irreversible shear degradation. Thus, the weight average molecular weights are preferably about 200,000 to about 10,000,000, more preferably about 500,000 to about 8,000,000, and most preferably about 1,000,000 to about 7,000,000. The intrinsic viscosity of these polymers, as measured in 2% sodium chloride solution, is preferably greater than about 1 dl/gm, but less than about 10 dl/gm.

The terpolymers may be synthesized by either of two processes, both of which rely on dispersing the water insoluble or hydrophobic monomer on a very fine scale into an aqueous solution of the water soluble monomer. The product in both cases is substantially free of microgel or particulates of insoluble polymer.

One process relies on cosolubilizing the water insoluble or hydrophobic N-alkylacrylamide monomer into a predominantly aqueous media containing acrylamide monomer and perhaps acrylic acid or a monovalent salt of acrylic acid by the use of a special mixture of surfactant, cosurfactant and hydrocarbon oil. The resultant fluid has the water insoluble monomer dispersed on almost a molecular scale. This isotropic, translucent to transparent, homogeneous fluid is called a microemulsion. Further details as to the type and level of surfactants, cosurfactants, hydrocarbon oil and monomers can be found in U.S. Pat. No. 4,521,580, which is herein incorporated by reference. It should be realized that when an anionic monomer, such as acrylic acid or salt of acrylic acid, is used only anionic or nonionic surfactants can be used. Cationic surfactants will complex with the anionic monomer and cause precipitation and, thus, cannot be used for preparing the compositions of this invention.

An alternative process for dispersing the water insoluble or hydrophobic monomer into a predominantly aqueous phase containing the dissolved water soluble monomers, such as acrylamide and acrylic acid or a salt of acrylic acid, makes use of a single surfactant or mixture of surfactants with no hydrocarbon oil. In order to prevent the formation of undesirable particulates of insoluble polymer the surfactant must be chosen to be one that is capable of solubilizing the water insoluble monomer on an extremely fine scale so that the resulting mixture is isotropic, clear and homogeneous. Thus, the solubilization of the hydrophobic monomer must take place in the micelles that form when the surfactant is dissolved into the water at concentrations above the critical micelle concentration. Further details of this polymerization technique can be found in U.S. Pat. No. 4,528,348, which is herein incorporated by reference. The critical aspect is that the micellar reaction mixture of monomers permits a uniform polymerization to occur such that the resultant polymer does not contain particulates or latices of water insoluble polymer.

The surfactants which may be used in this process may be one of a variety of anionic water soluble surfactants, such as salts of alkyl sulfates, sulfonates and carboxylates, or alkyl arene sulfates, sulfonates or carboxylates. Preferred are sodium or potassium salts of decyl sulfate, dodecyl sulfate or tetradecyl sulfate; most preferred is sodium dodecyl sulfate. For these ionic surfactants the Krafft point, which is defined as the minimum temperature for micelle formation, must be below the temperature used for the polymerization. Thus, at the conditions of polymerization, the desired surfactant will form micelles which solubilize the water insoluble monomer.

Nonionic surfactants can also be used for preparing the polymers of this invention. For example, ethoxylated alcohols, ethoxylated alkyl phenols, ethoxylated dialkyl phenols, ethylene oxide-propylene oxide copolymers and polyoxyethylene alkyl ethers and esters can be used. Preferred nonionic surfactants are ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule.

Surfactants which contain both nonionic and anionic functionality, e.g., sulfates and sulfonates of ethoxylated alcohols and alkyl phenols, can be used. Combinations of anionic and nonionic surfactants can also be used as long as the surfactants solubilize the hydrophobic monomer into an aqueous phase containing the water soluble monomers. The surfactant or mixtures of surfactants will be used at concentrations above their critical micelle concentration and preferably at concentrations such that only about one hydrophobic monomer is associated with a surfactant micelle. Thus, the actual concentration of surfactant for uniform polymerization will depend on the concentration of oil soluble or hydrophobic monomers employed.

Polymerization of the water soluble and water insoluble monomers is effected in an aqueous micellar solution containing a suitable free radical initiator. Examples of suitable water soluble free radical initiators include peroxides, such as hydrogen peroxide, and persulfates, such as sodium, potassium or ammonium persulfate. Suitable oil soluble initiators are organic peroxides and azo compounds, such as asobisisobutyronitrile. Water soluble initiators are preferred, such as potassium persulfate. Redox initiation involving an oxidant, such as potassium persulfate, and a reductant, such as sodium metabisulfite, can also be used to initiate polymerization, particularly at low temperatures. Polymerizing at lower temperature results in the formation of higher molecular weight polymers which are desirable from the standpoint of efficient aqueous viscosification. Typically, it is desired to employ from about 0.01 to about 0.5 weight percent of initiator based on the weight of monomers. The polymerization temperature is preferably about 20° C. to about 90° C., more preferably about 25° C. to about 80° C., and most preferably about 30° C. to about 70° C.

The hydrophobically associating terpolymers of this invention can be prepared by the micellar free radical copolymerization process which comprises the steps of forming a micellar surfactant solution of the oil soluble or hydrophobic alkylacrylamide in an aqueous solution of acrylamide; deareating this solution by purging with nitrogen or additionally applying a vacuum; raising the temperature to the desired reaction temperature; adding sufficient free radical initiator to the reaction solution; and polymerizing for a sufficient period of time at a sufficient temperature to effect polymerization. Base can be added to the polymerized reaction mixture to convert some of the acrylamide to acrylic acid groups. The hydrolysis reaction can be performed with a stoichiometric amount of base at a temperature of preferably about 30° C. to about 90° C., more preferably about 40° C. to about 80° C., and most preferably about 45° C. to about 70° C. for about 1 to 10 hours. Higher amounts of base can be employed to accelerate the hydrolysis, which then could be run for either a shorter time or at a lower temperature. The resulting terpolymer of acrylamide, a salt of acrylic acid and a hydrophobic N-alkyl acrylamide can be isolated from the reaction mixture by any of a variety of techniques which are well known to one skilled in the art. For example, the polymer may be recovered by precipitation using a non-solvent, such as acetone, methanol, isopropanol or mixtures thereof. The precipitated polymer can then be washed and oven dried to provide a product in the form of a free flowing powder. Alternatively, the polymer solution may be used as is by dilution with the desired aqueous solvent to the concentration of use.

An alternative method for preparing the terpolymers of this invention is to use acrylic acid monomer or a monovalent salt of acrylic acid, such as sodium or potassium acrylate, along with acrylamide and the micellar dispersion of the hydrophobic N-alkylacrylamide in the initial reaction mixture. Similar polymerization and isolation conditions could be used as described above without the need for a post hydrolysis reaction.

The terpolymer compositions of this invention have been found useful for thickening aqueous fluids. To prepare these thickened fluids, an amount of the terpolymer thickening agent is dissolved in the aqueous fluid by agitation using any of a number of techniques well known in the art. For example, a marine impeller operating at relatively low speed can be used to first disperse and then dissolve these hydrophobically associating terpolymers. It is desirable to use relatively low agitation conditions since these polymers have a tendency to cause and stabilize foams which can be difficult to break. The aqueous solutions may be distilled water, or contain a high concentration of electrolyte in water, such as that in hard water or brine having a salt concentration (NaCl) of about 0.1 to about 10 weight percent. Monovalent, inorganic salts, such as sodium chloride, and divalent salts, such as calcium or magnesium chloride, or sulfate can be present in the brine in substantial amounts. A preferred method for preparing the thickened brine solutions involves first preparing a concentrated solution of the polymer in relatively fresh water and then adding a concentrated brine solution to obtain the desired final thickened brine solution. The amount of polymeric thickening agent needed to produce a desired level of viscosification will depend on the composition of the electrolytes in the aqueous fluid and the temperature. In general, more polymer will be required as the electrolyte concentration increases and as the temperature increases. Viscosification of about 2 to about 100 times or more that of the neat solvent can readily be achieved with the terpolymers of this invention. Preferably, about 0.01 to about 2.0 weight percent, more preferably about 0.05 to about 1.0 weight percent, and most preferably about 0.1 to about 0.5 weight percent polymer based on the aqueous medium will provide the desired level of thickening efficiency.

The thickening efficiency of a given polymer is influenced by the amount of anionically charged acrylate groups, the level and type of hydrophobic groups and the weight average molecular weight. The addition of the anionic acrylate groups improves polymer solubility and enhances thickening efficiency due to repulsion of charges along the backbone which tends to open the polymer coil and increase hydrodynamic volume. The hydrophobic groups decrease polymer solubility and associate in solution to physically bridge polymer molecules, creating greater resistance for flow and, hence, increased viscosity. The more insoluble the hydrophobic group is in the solvent, the less that is needed to create the associations in solution. For example, less dodecylacrylamide is needed in a polymer to create the same viscosification as a larger amount of octyl acrylamide in a similar polymer. In addition, it is possible to have too much association, in which case the polymer becomes insoluble in the solvent and cannot be used as a viscosifier. Fortunately, the solubility characteristics of the acrylate and hydrophobic groups go in opposite directions and, thus, the addition of more acrylic acid can be used to counter balance the addition of hydrophobic groups. Increasing both acrylate and hydrophobic groups can result in a synergistic enhancement of thickening efficiency.

Molecular weight of the polymer is also an important consideration. High molecular weight polymers incorporating both anionically charged acrylate groups and hydrophobic groups can provide significantly improved viscosification of water based fluids. All other things being equal, the higher the molecular weight the less soluble the polymer. Thus, as molecular weight is increased the amount of hydrophobic groups should be reduced and the amount of acrylate groups increased. It is desirable that the resulting polymer in an aqueous solution not be susceptible to irreversible mechanical degradation under shear. This places an upper limit on the molecular weight of about 10,000,000. Control of molecular weight is achieved by the concentration of monomers, the type and level of initiator and the reaction temperature. As is well known in the art, the molecular weight is increased by increasing the monomers level and decreasing the initiator level and reaction temperature.

To evaluate and characterize the unique and useful properties of the hydrophobically associating polymers of this invention, dilute solution viscometric measurements were made. These measurements are particularly useful for evaluating the effect of composition and polymerization process conditions on the hydrodynamic size of the polymer in solution and the influence of associating groups. The hydrodynamic size is measured by the intrinsic viscosity which is related to the viscosity average polymer molecular weight. To determine the intrinsic viscosity the reduced viscosity is first evaluated at several polymer concentrations in the dilute concentration regime. The reduced viscosity is defined as the incremental viscosity increase of the polymer solution relative to the pure solvent normalized with respect to the pure solvent viscosity and the polymer concentration. A plot of reduced viscosity versus polymer concentration should yield a straight line at low polymer concentrations. The intercept of this reduced viscosity plot at zero polymer concentration is defined as the intrinsic viscosity, while the slope is the Huggin's interaction coefficient times the square of the intrinsic viscosity. The Huggin's constant is a measure of polymer-solvent interactions. For hydrophobically associating polymers it is characteristically greater than the 0.3 to 0.7 value normally observed for non-associating polymers, as such as polyacrylamides.

Measurement of the dilute solution viscosity can be made with conventional Couette or capillary viscometers. A set of Ubbelohde capillary viscometers were used in this study and shear rate effects were found to be negligible in the concentration range of interest. However, since the terpolymers contain anionically charged groups, a polyelectrolyte effect was observed in dilute solution. This polyelectrolyte effect resulted in an increase in reduced viscosity with decreasing polymer concentration and tended to mask the effect of hydrophobic associations. The addition of salts, such as sodium chloride or sodium sulphate, shields the charge repulsion causing the polyelectrolyte effect and results in the desired linear reduced viscosity-concentration profile. The dilute solution measurements were, therefore, made on solutions containing 2.0 weight percent sodium chloride.

The solution viscosity of associating polymers in the semi-dilute concentration regime is dramatically different than conventional water soluble polymers. Viscosities of these solutions were measured by means of a Conraves low shear viscometer, model LS 30, using a No. 1 and No. 1 bob. Temperatures were controlled to ±0.01° C. and measurements were made at a variety of rotational speeds corresponding to shear rates from about 1.0 sec$^{-1}$ to about 100 sec$^{-1}$. In contrast to conventional water soluble polymers and relatively low molecular weight, weakly associating polymers, the terpolymers of this invention can exhibit signficant relaxation times which result in slow equilibration. To determine steady state viscosity values at a given stress or shear rate, relatively long measurement times were employed. This effect is most evident at higher polymer concentrations, higher molecular weights and in regions of strong intermolecular hydrophobic associations.

DESCRIPTION OF THE PREFERRED EMBODIMENTS

The following Examples illustrate the present invention without, however, limiting the same hereto.

EXAMPLE 1

Synthesis of HRAM Polymer

An HRAM terpolymer of acrylamide, sodium acrylate and N-n octyl acrylamide was synthesized using the micellar polymerization technique. In a 5 liter glass reactor equipped with stainless steel baffles, turbine impellers and nitrogen sparger, 75.0 grams of acrylamide (AM), 80 grams of sodium dodecyl sulfate (SDS), 2.0 grams (1.0 mole percent) of N-n-octyl acrylamide and 2425 grams of distilled water were mixed to form a homogeneous transparent solution. The reaction fluid was deoxygenated by sparging with nitrogen (N$_2$) for 2 hours while heating to bring the temperature up to 50° C. At temperature the initiator, 0.05 grams of potassium persulfate (K$_2$S$_2$O$_8$) in 10 ml of deoxygenated water was added. The reaction was maintained at 50° C. with gentle agitation for 18 hours. While maintaining the reaction temperature at 50° C., 200 ml of 50% sodium hydroxide (NaOH) or 0.40 moles of NaOH were added and allowed to react for 1 hour. The resulting terpolymer was isolated by precipitating in 5 liters of methanol. The swollen polymer mass was ground in a Waring blender, washed with methanol and vacuum oven dried at 40° C. for 16 hours. This HRAM polymer, designated Example 1, was a white, friable material with 3 weight percent moisture as determined by weight loss following 24 hours of vacuum oven drying at 110° C. Nitrogen and sodium analysis, along with potentiometric titration, showed that the polymer contained 18.4 mole percent sodium acrylate groups.

TABLE I

| | HRAM Polymers | | | | |
|---|---|---|---|---|---|
| | Hydrolysis Conditions | | | Composition | |
| Example No. | NaOH Moles | Temp °C. | Time Min. | COONa Mole % | C$_8$AM Mole % |
| 1 | 0.40 | 50 | 60 | 18.4 | 10 |
| 2 | — | — | — | 0.3 | 1.0 |
| 3 | 0.25 | 50 | 60 | 13.1 | 1.0 |
| 4 | 0.70 | 50 | 60 | 22.0 | 1.0 |
| 5 | 0.70 | 50 | 120 | 24.0 | 1.0 |
| 6 | 1.0 | 50 | 60 | 34.0 | 1.0 |
| 7 | 0.15 | 50 | 60 | 7.6 | 1.0 |
| 8 | 0.30 | 50 | 60 | 12.7 | 1.0 |
| 9 | 0.40 | 50 | 60 | 18.0 | 0.75 |
| 10 | 0.40 | 50 | 60 | 15.2 | 1.25 |
| 11 | 0.40 | 50 | 90 | 19.5 | 1.25 |
| 12 | 0.40 | 50 | 90 | 18.4 | 1.25 |
| 13 | 0.40 | 50 | 60 | — | 1.0[1] |
| 14 | 0.40 | 50 | 60 | — | 1.1[2] |

[1]Decyl Acrylamide.
[2]Dodecyl Acrylamide

COMPARATIVE EXAMPLE 1

Preparation of HPAM Polymer

A partially hydrolyzed polyacrylamide (HPAM) copolymer was synthesized using a similar procedure as described in Example 1. Using the same reactor set-up, 75 grams of acrylamide, 80 grams of SDS and 2,425 grams of distilled water were mixed and sparged with nitrogen for 12 hours while heating to 50° C. The initiator, 0.05 grams of K$_2$S$_2$O$_8$, in 10 ml. of deoxygenated water was then added. The reaction was maintained at 50° C. with gentle agitation for 18 hours and then 200 ml of 50% NaOH (0.40 moles) was added and allowed to react for 1 hour. The resulting HPAM polymer was then isolated by precipitation in 5 liters of methanol, ground and washed with methanol in a Waring blender and vacuum oven dried at 40° C. for 16 hours. This partially hydrolyzed polyacrylamide, designated Comparative Example 1, was a white, friable material with 4% moisture and 18.2% sodium acrylate groups.

EXAMPLES 2 TO 8

Effect of Hydrolysis Conditions

A series of copolymers consisting of 99 mole percent acrylamide and 1.0 mole percent N-n-octyl acrylamide were prepared using the recipe and procedures described in Example 1. At the end of copolymerization, different hydrolysis reaction conditions were used to prepare terpolymers with different levels of anionically charged sodium acrylate groups. Prior studies had indicated that hydrolysis was very slow at 40° C. and, thus, temperature was held at 50° C. The amount of base, in terms of the moles of sodium hydroxide per mole of acrylamide and the reaction times were varied, as shown in Table I. The degree of hydrolysis is a direct function of the amount of base and, thus, is the major variable for controlling charge content in the terpolymer. The compositions of the resulting HRAM polymers are also given in Table I, with the mole percent sodium acrylate determined by titration and sodium analysis.

EXAMPLES 9 AND 10

Different Hydrophobe Contents

Using the recipe and polymerization procedures described in Example 1, terpolymers were prepared with 0.75 and 1.25 mole percent N-n-octyl acrylamide monomer. These are designated as Examples 9 and 10, respectively. Both polymers were hydrolyzed under the same conditions as used for Example 1 in Table I.

An interesting observation was made comparing Examples 9, 1 and 10. As the amount of hydrophobe increases the level of hydrolysis or sodium acrylate content decreases slightly. This is an indication of improved hydrolytic stability of the hydrophobically associating terpolymers.

EXAMPLES 11 AND 12

Polymerization Conditions

In an attempt at increasing the molecular weight of the HRAM terpolymer, reaction temperature and initiator level were varied. The polymerization procedure and recipe was similar to that used for Example 10, with the following changes. First, the reaction temperature was reduced from 50° to 45° C. and the hydrolysis reaction time increased from 60 to 90 minutes. The polymer produced by this procedure is designated Example 11. A second polymer, designated Example 12, was polymerized at 45° C. and, in addition, the $K_2S_2O_8$ initiator was reduced from 0.05 to 0.03 grams. This results in an increase of the monomer concentration to the square root of the initiator concentration from 50 to 63. Also the hydrolysis reaction time was changed to 90 minutes. Both the reduction in polymerization temperature and the increase in monomer to initiator ratio should result in an increase in the polymer molecular weight, which in turn should result in polymers with increased aqueous fluid thickening efficiency. As shown in Table I, the compositions of these polymers were essentially identical, although the molecular weight, molecular weight distribution and sequence distribution could be considerably different.

EXAMPLES 13 AND 14

Hydrophobic Monomer Structure

The structure of the hydrophobic monomer is an important consideration in controlling the viscosification efficiency of the terpolymers of this invention. First, the monomer must be essentially insoluble in water. This precludes the use of alkyl groups with four carbons or less. To evaluate the influence of longer chain lengths a decyl acrylamide and a dodecyl acrylamide monomer were used with the synthesis conditions described in Example 1. In place of 2.0 grams of N-n-octyl acrylamide in the recipe of Example 1, 2.3 grams (1.0 mole percent) N-n-decyl acrylamide was used to form the polymer of Example 13. Similarly, 2.6 grams (1.0 mole percent) of N-n-dodecyl acrylamide was used as the hydrophobic monomer to form the polymer of Example 14. The resulting polymer had extremely high viscosity and were essentially solid gels at 3.0 weight percent solids in the reactor. This compares to aqueous fluids at 10,000 cp at similar concentrations using the octyl hydrophobe in place of the decyl or dodecyl. Thus, as the chain length on the hydrophobic monomer increases, the amount of hydrophobe used for the polymerization should decrease to maintain comparable solubility and viscosification characteristics.

EXAMPLE 15

Dilute Solution Properties

A series of terpolymers of acrylamide, sodium acrylate, and hydrophobic monomers of alkylacrylamide, described in Examples 1 to 14, and a copolymer of acrylamide and sodium acrylate, described in Comparative Example 1, were dissolved in a 2.0% NaCl solution at 2,000 ppm. Multiple dilutions of these solutions were made at different polymer concentrations to obtain 5 solutions with viscosities from 1.1 to about 2.0 times the solvent viscosity, Plots of reduced viscosity versus polymer concentration were analyzed with the following equation:

$$[(\eta-\eta_o)(\eta_o C)] = [\eta] + K_h[\eta]^2 C$$

where $\eta$ is the polymer solution viscosity at a concentration, C, in gm/dl and $\eta_o$ is the solvent viscosity;

TABLE II

| | Dilute Solution Properties | | | |
|---|---|---|---|---|
| | Composition, Mole % | | Intrinsic | Huggin's |
| Example No. | Sodium Acrylate | Hydrophobe Level | Viscosity dl/g | Coefficient $K_h$ |
| 1 | 18.4 | 1.0 | 8.0 | 1.0 |
| Comp. 1 | 18.2 | 0.0 | 9.6 | 0.42 |
| 2 | 0.3 | 1.0 | 3.4 | 2.5 |
| 3 | 13.1 | 1.0 | 7.1 | 1.3 |
| 6 | 34.0 | 1.0 | 9.0 | 0.71 |
| 7 | 7.6 | 1.0 | 4.3 | 3.1 |
| 8 | 12.7 | 1.0 | 5.9 | 1.9 |
| 9 | 18.0 | 0.75 | — | — |
| 10 | 15.2 | 1.25 | 4.9 | 2.4 |
| 11 | — | — | 5.1 | 3.1 |
| 12 | — | — | 4.7 | 4.6 | to yield the intrinsic viscosity, $[\eta]$, and Huggin's interaction coefficient, $k_h$, as shown in Table II. The intrinsic viscosity is directly related to the polymer molecular weight, but also is a function of amount of charged anionic acrylate groups and the amount of hydrophobic groups. As the amount of sodium acrylate groups in the polymer increase, the intrinsic viscosity also increases. This is illustrated in Table II for Examples 2, 7, 8, 3, 1 and 6, which have sodium acrylate content increasing from 0.3 to 34.0 mole percent. The intrinsic viscosity increases from 3.4 to 9.0 dl/g, respectively. This indicates that the hydrodynamic size of the polymer is increasing due to charge repulsion created by the anionic groups. A measure of the degree of association of the hydrophobic groups is provided by the Huggin's interaction coefficient, which is obtained from the slope of the reduced viscosity-concentration plot. As shown in Table II, the Huggin's constant decreases as the amount of sodium acrylate groups increase. Looking at the same set of polymers as above, the Huggin's constant decreases from about 2.5 to 0.71 as the amount of acrylate groups increase from 0.3 to 34 mole percent, respectively. This suggests that the associations are decreasing or solvent character is improving with increasing acrylate content.

The influence of acrylate on the intrinsic viscosity and Huggin's coefficient can be counter balanced by increasing the amount of hydrophobic groups, as shown by Example 10 in Table 2. Increasing the amount of hydrophobic octyl acrylamide groups reduces the intrinsic viscosity and increases the Hugginn's constant. The increase in the Huggin's coefficient seems to be a good indicator of the presence of hydrophobic groups. As shown in Table II, a comparative HPAM polymer (Comparative Example 2) has the lowest Huggin's constant (0.42), typical of most water soluble polymers; while the hydrophobe containing polymers have values from 0.71 to 4.6. A higher Huggin's constant indicates that the solution viscosity will increase faster with the polymer concentration, and at concentrations in the semi-dilute regime the viscosity will be significantly higher than an otherwise comparable solution with low Huggin's constant. Thus, the terpolymers of this invention should exhibit enhanced viscosification at higher polymer concentrations. Also, the data in Table II indicates that the presence of hydrophobic groups had a measurable effect on the dilute solution properties at concentrations as low as 50 ppm.

TABLE III

| Example No. | Solution Viscometrics | | |
|---|---|---|---|
| | Polymer Concentrations[1] ppm | Solution Viscosity[2] cP | Screen Factor |
| 1 | 1,000 | 3.4 | 4.3 |
| | 2,000 | 15.0 | 12.0 |
| Comp. 1 | 1,000 | 2.4 | 4.5 |
| | 2,000 | 4.6 | 5.5 |
| 2 | 1,000 | 2.1 | — |
| | 2,000 | 95.0 | — |
| 3 | 1,000 | 3.3 | 3.8 |
| | 2,000 | 23.0 | 19.0 |
| 4 | 1,000 | 3.1 | 4.2 |
| | 2,000 | 10.0 | 10.0 |
| 5 | 1,000 | 3.2 | 3.3 |
| | 2,000 | 11.0 | 7.0 |
| 6 | 1,000 | 3.0 | 3.9 |
| | 2,000 | 8.0 | 8.0 |
| 7 | 1,000 | 2.9 | 3.5 |
| | 2,000 | 15.0 | 11.0 |
| 8 | 1,000 | 3.2 | 3.3 |
| | 2,000 | 15.0 | 9.0 |
| 10 | 1,000 | 3.1 | 3.0 |
| | 2,000 | 65.0 | 30.0 |

[1]Solvent for these measurements was 2.0% NaCl solution in water.
[2]Viscosity measured at 1.3 sec$^{-1}$ shear rate.

EXAMPLE 16

Solution Viscometrics

To evaluate the ability of the terpolymers of this invention to control aqueous solution viscometric properties, solutions were prepared with several of the polymers from Examples 1 to 12. The solvent was 2.0% NaCl and polymer concentrations were 1,000 and 2,000 ppm. Solution viscosity was determined using a Contraves LS 30 rotational viscometer at 1.28 sec$^{-1}$ shear rate and 25° C. The solution shear viscosity is a measure of the resistance of the fluid to being deformed by shear. A somewhat different type of viscosity is extensional viscosity, which measures the resistance of a fluid to being extended. A technique which attempts to measure this latter effect is the screen factor. The measurement consists of determining the flow time of a polymer solution through a set of five 200 mesh screens relative to the flow time of the pure solvent. Solutions which have a high degree of elasticity will exhibit high screen factors. Table III shows the solution viscosities and screen factors determined on polymer solutions in 2.0% NaCl. As shown, increasing polymer concentration from 1,000 to 2,000 ppm resulted in a significant increase in viscosity and screen factor, particularly for the terpolymers containing hydrophobic groups. Solutions of the terpolymer of Example 1 showed approximately a five-fold increase in viscosity and a three-fold increase in screen factor when polymer concentration increased from 1,000 to 2,000 ppm. In contrast, solutions of comparative Example 1 showed only a two-fold and about a 20% increase in viscosity and screen factor, respectively over the same concentration range. Comparing the terpolymer solution of Example 1 and Comparative Example 1 at 2,000 ppm, the terpolymers of this invention showed more than a three-fold increase in viscosity and more than a two-fold increase in screen factor relative to a similarly prepared polymer, except without the hydrophobically associating groups. Examining some of the other terpolymers in Table III containing lower amounts of sodium acrylate groups and/or higher amounts of octyl acrylamide groups, the enhancement in viscosity and screen factor was even more dramatic. The low acrylate containing polymer of Example 2 showed over a 20 fold improvement in solution viscosity relative to the HPAM polymer of Comparative Example 1. Increasing the hydrophobe content from 1.0 to 1.25 mole percent, as in Example 10, results in more than a four-fold enhancement in solution viscosity and over an order of magnitude improvement relative to the corresponding HPAM of Comparative Example 1.

EXAMPLE 17

Solution Viscometrics in Brine

Solutions of several of the polymers previously described were prepared at concentrations of 1,000, 1,500 and 2,000 ppm in a brine consisting of 3.0% NaCl and 0.3% CaCl$_2$. Viscosity was determined at shear rates of 1.3 sec$^{-1}$ and 11 sec$^{-1}$. As shown in Table IV, the terpolymer illustrated by Example 1 provides considerably higher solution viscosity than the corresponding copolymer of Comparative Example 1 at all concentrations and shear rates tested. The enhancement of viscosity of the hydrophobe containing polymers of this invention increases as the polymer concentration increases and as the amount of hydrophobic groups increase (see Example 12 relative to Example 1).

TABLE IV

| | Solution Viscometrics in Brine[1] | | |
|---|---|---|---|
| Example No. | Polymer Concentration ppm | Solution, 1.3 sec$^{-1}$ | Viscosity, cP 11.0 sec$^{-1}$ |
| 1 | 1,000 | 3.0 | 2.5 |
| | 1,500 | 5.3 | 5.0 |
| | 2,000 | 14.0 | 12.0 |
| Comp. 1 | 1,000 | 2.0 | 2.0 |
| | 1,500 | 3.0 | 3.0 |
| | 2,000 | 4.0 | 4.0 |
| 2 | 1,000 | 2.1 | 1.6 |
| | 1,500 | 14.0 | 11.0 |
| | 2,000 | 95.0 | 43.0 |
| 10 | 1,000 | 3.5 | 3.4 |
| | 1,500 | 7.0 | 6.5 |
| | 2,000 | 30.0 | 122.0 |
| 11 | 1,000 | 3.0 | 3.0 |
| | 1,500 | 13.0 | 11.0 |
| 12 | 1,000 | 3.2 | 3.1 |
| | 1,500 | 23.0 | 98.0 |

[1]Brine solution contains 3.0% NaCl and 0.3% CaCl$_2$

The viscosity of solutions of hydrophobically associating polymers can exhibit quite unusual shear rate dependence. As shown in Table IV, these solutions can be essentially Newtonian with viscosity independent of shear rate, as in Examples 1 and 11; pseudoplastic with viscosity decreasing with shear rate, as in Example 2; and dilatant, with viscosity increasing with shear rate, as in Examples 10 and 12. This versatility in the shear rate response of viscosity can be controlled by the amount of acrylate and hydrophobic groups in the terpolymer. The ability of a solution to exhibit different viscosity-shear rate profiles could be quite useful in regulating flow properties at different flow conditions and exemplifies a unique characteristic of the hydrophobically associating terpolymers of this invention.

EXAMPLE 18

Salt Sensitivity

One of the major deficiencies of aqueous viscosifiers based on polymers containing ionic groups is the salt sensitivity of the viscosity. To assess this sensitivity the viscosity of a polymer solution in distilled water was compared to the viscosity of the same solution containing salt. Solutions at two polymer concentrations (i.e., 1,000 and 2,000 ppm) and three salt contents (i.e., 0, 0.5 and 2.0% NaCl) were prepared and their viscosity determined at two shear rates (i.e., 1.3 and 11.0 sec$^{-1}$). As shown by the data in Table V, all of these variables have an effect on the ratio of the viscosity of the solution in water to the viscosity of the solution containing salt. In general, the terpolymers of this invention, illustrated by Example 1, are significantly less sensitive than an HPAM copolymer (Comparative Example 1) to the salt content of the solution. This is shown by the viscosity ratios given in Table V. For example, comparing these polymers at 1,000 ppm, 1.3 sec$^{-1}$ shear rate and 2.0% NaCl, the viscosity ratio was 52 and 98 for the HRAM terpolymer and comparative HPAM copolymer, respectively. This indicates that at these conditions, the HRAM polymer has approximately half the salt sensitivity as the HPAM polymer. As the amount of hydrophobic octyl acrylamide groups increase (see Example 10) the salt sensitivity is reduced considerably. In fact, the HRAM polymer of Example 10 at 2,000 ppm, 11 sec$^{-1}$ shear rate and 2.0% NaCl had a viscosity ratio of less than 1.0. This indicates that the addition of salt to the polymer solution in water has resulted in an increase in solution viscosity. The data in Table V suggest that for certain ranges of conditions, HRAM polymers can be designed which would provide solutions with salt insensitive viscosity. This could be of significant benefit in applications where one desires a fixed viscosity level tolerant of variation in salt content.

TABLE V

| Example No. | Polymer Concentration ppm | Shear Rate sec$^{-1}$ | Salt Concentration % NaCl | Viscosity* Ratio |
|---|---|---|---|---|
| 1 | 1,000 | 1.3 | 0.5 | 40 |
|  |  | 11.0 | 2.0 | 52 |

TABLE V-continued

| Example No. | Polymer Concentration ppm | Shear Rate sec$^{-1}$ | Salt Concentration % NaCl | Viscosity* Ratio |
|---|---|---|---|---|
|  |  |  | 0.5 | 19 |
|  |  |  | 2.0 | 26 |
|  | 2,000 | 1.3 | 0.5 | 28 |
|  |  |  | 2.0 | 14 |
|  |  | 11.0 | 0.5 | 28 |
|  |  |  | 2.0 | 14 |
| Comp. 1 | 1,000 | 1.3 | 0.5 | 61 |
|  |  |  | 2.0 | 98 |
|  |  | 11.0 | 0.5 | 24 |
|  |  |  | 2.0 | 38 |
|  | 2,000 | 1.3 | 0.5 | 49 |
|  |  |  | 2.0 | 85 |
|  |  | 11.0 | 0.5 | 20 |
|  |  |  | 2.0 | 33 |
| 10 | 1,000 | 1.3 | 0.5 | 23 |
|  |  |  | 2.0 | 32 |
|  |  | 11.0 | 0.5 | 14 |
|  |  |  | 2.0 | 20 |
|  | 2,000 | 1.3 | 0.5 | 5 |
|  |  |  | 2.0 | 2 |
|  |  | 11.0 | 0.5 | 4 |
|  |  |  | 2.0 | .5 |

*Viscosity Ratio is the ratio of polymer solution viscosity in water relative to salt.

The information provided by these Examples illustrate the unique viscosity enhancing characteristics of the hydrophobically associating HRAM terpolymers of this invention. These polymers viscosify at lower polymer concentrations, impart viscosity characteristics with unique shear rate response and improved salt tolerance.

What is claimed is:

1. A terpolymer having the formula:

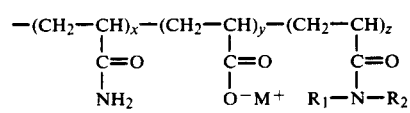

wherein $R_1$ is a straight or branched chained alkyl or cycloalkyl having about 6 to about 22 carbon atoms; $R_2$ is the same as $R_1$ or different alkyl group or hydrogen; x is about 60 to about 98 mole percent; y is about 2 to about 40 mole percent; and z is about 0.1 to about 10.0 mole percent and $M^+$ is an alkali metal or ammonium cation.

2. A terpolymer according to claim 1 wherein $R_1$ is an octyl group and $M^+$ is a sodium ion.

3. A solution of the terpolymer according to claim 1, wherein said terpolymer is dissolved in a brine solution.

4. A terpolymer according to claim 1, wherein said terpolymer has a molecular weight of at least 1,000,000.

* * * * *